US006481279B1

(12) United States Patent
Shaw et al.

(10) Patent No.: US 6,481,279 B1
(45) Date of Patent: Nov. 19, 2002

(54) ABSOLUTE INVENTORY CONTROL BY RADIAL FORCE MEASUREMENT

(75) Inventors: Gordon Shaw, Charlotte, NC (US); Walter Jeffrey Stikeleather, Moore, SC (US); Cynthia Broom, Inman, SC (US)

(73) Assignee: Arteva North America S.a.r.l., Zurich (CH)

( * ) Notice: Subject to any disclaimer, the term of this patent is extended or adjusted under 35 U.S.C. 154(b) by 51 days.

(21) Appl. No.: 09/717,880

(22) Filed: Nov. 21, 2000

(51) Int. Cl.[7] .......................... G01F 19/00; G01F 17/00; G01F 23/00
(52) U.S. Cl. .......................... 73/426; 73/149; 73/290 R
(58) Field of Search ............................... 73/290 R, 149, 73/426, 432; 399/27

(56) References Cited

U.S. PATENT DOCUMENTS

| 3,575,130 A | * | 4/1971 | Altmann | 73/149 |
| RE287,565 | * | 4/1976 | Matkan | 118/637 |
| 4,157,036 A | * | 6/1979 | Kivenson | 73/290 R |
| 4,237,261 A | | 12/1980 | Kawamura | 528/272 |
| 4,250,745 A | | 2/1981 | Blatter | 73/118 |
| 4,289,026 A | * | 9/1981 | Neumann | 73/290 R |
| 4,468,953 A | | 9/1984 | Garritano | 73/60 |
| 5,599,507 A | | 2/1997 | Shaw | 422/135 |
| 5,649,449 A | | 7/1997 | Algers | 73/168 |
| 5,814,282 A | | 9/1998 | Lohe | 422/135 |

* cited by examiner

Primary Examiner—Hezron Williams
Assistant Examiner—Katina Wilson
(74) Attorney, Agent, or Firm—Gregory N. Clements

(57) ABSTRACT

A method and device for monitoring and optionally controlling the absolute inventory of a dynamic fluid in a vessel having at least one agitator with a rotatable shaft extending in an essentially horizontal direction, wherein there is a resultant force acting on the agitator in an essentially vertical direction in relation to the shaft and a relationship exists between the absolute inventory and the force acting on the agitator in the essentially vertical direction. The method comprises determining a correlation between the vessel absolute inventory and resultant force, measuring the resultant force, and thereby determining a relative absolute inventory within the vessel. The determined absolute inventory value may then be used as a control variable for use in controlling the absolute inventory within the vessel.

24 Claims, 1 Drawing Sheet

ABSOLUTE INVENTORY CONTROL BY RADIAL FORCE MEASUREMENT

FIELD OF THE INVENTION

The present invention relates to a method for monitoring and optionally controlling the absolute inventory of a fluid, especially a polymer, in a vessel and more particularly in such vessels having at least one agitator with a rotatable shaft extending in an essentially horizontal direction. The method of the present invention involves measuring a resultant force acting on the agitator in an essentially vertical direction in relation to the shaft(s) (i.e. radial to the shaft), relating such resultant force to an absolute inventory value, and optionally controlling the absolute inventory of fluid based upon the inventory value. The present invention also relates to a device which measures a resultant force acting on the agitator in an essentially vertical direction in relation to the shaft(s), which resultant force may be related to an absolute inventory value.

BACKGROUND OF THE INVENTION

Various methods have been proposed for measuring properties of fluids. Such methods include, for example, methods for measuring the viscosity, elasticity, and flow rate of a fluid. U.S. Pat. No. 4,468,953, Garritano, discloses a torsion tube apparatus for making on-line measurements of the viscosity and elasticity of a fluid.

Various methods have also been proposed for measuring the characteristics of vessels that contain fluids. Such methods include, for example, measuring the stirring power of an agitator or mixing device within the reactor. U.S. Pat. No. 4,237,261, Kawamura et al., discloses a process for automatically and continuously measuring the stirring power (the externally applied power of a motor) or stirring axis reaction force (the resistance of the polymer to stirring) of at least the final polymerization reactor among all the polymerization reactors, from which a polymer having a limiting viscosity of 0.25 or more is removed. In Kawamura, the polymerization process is controlled by changes in the reactor vacuum. The vacuum in the polymerization reactor is varied based on changes in the stirring power or the stirring axis reaction force so that the stirring power or stirring axis reaction force is kept at a prescribed level whereby the degree of polymerization of the polymer removed from the polymerization reactor is controlled.

U.S. Pat. No. 5,649,449, Algers, discloses a method and apparatus for determining the current or instantaneous operation conditions of a centrifugal pump. In Algers, the radial forces impressed on the impeller shaft by the rotating pump impeller are measured at the shaft-supporting bearing disposed proximate the pump housing and impeller. In a preliminry or test operation of the pump, the radial force measurement is taken at a plurality of volumetric liquid flow rates through the pump so as to develop a relationship between the radial force and liquid flow. Then, during normal operations of the pump, the current or instantaneous radial force is measured at the bearing and this measurement is compared to the previously developed relationship to accurately determine the instantaneous operating flow conditions of the pump by identifying the point along the pump's characteristic curve, which defines for the pump a relationship between lifting height and volumetric liquid flow, at which the pump is currently operating. In Algers, the unit forces cannot be measured when the pump is empty. Furthermore, Algers does not disclose how to measure the inventory of the equipment to which the pump is attached, only the flow rate through the pump.

With respect to methods for monitoring or controlling the inventory of a fluid in a reactor or a vessel, metering or gear pumps can be incorporated in the supply to and removal of material from such a reactor or vessel and are a means of controlling both flow through the reactor or vessel or inventory within the reactor or vessel. However, metering pumps or gear pumps for example, used with polymer reactors have a mass flow error related to speed, which depends on the viscosity of the polymer being pumped and the pressure that must be developed that prevents speed alone from being a means of precise level or inventory control over an extended continuous operating period.

Conventional inventory monitoring methods in polymer reactors include differential pressure measurement devices that infer a column of liquid of an assumed density to infer a fluid height, flotation or volume displacer devices. Absorption of radiation from a nuclear source in which attenuation of the radiation signal occurs at a detector dependent on the material in the path of the radiation beam may also be used. The accuracy of this method is dependent upon many factors including selection of the source type, construction of the vessel, background radiation intensity and the type of polymeric material being measured. Typically these and other conventional inventory monitoring methods give a relative value which is indicative of the material present only in the exact location of measurement, and consequently such devices do not measure the total amount of inventory present within a reactor or vessel.

In the operation of a continuous polymerization reactor, it is very difficult to measure the total polymer inventory and even more difficult to maintain an accurate inventory over an extended period of time. Consequently, the need for accurate inventory control exists.

Another disadvantage associated with conventional monitoring devices for polymeric reactors is that they require penetration of the vessel shell, jacket, and wall, with insertion of a sensing component into the inner vessel space. Physical insertion of a sensor into a reactor and the use of conventional monitoring devices such as flotation devices, bubble tubes, and nuclear sources makes it difficult, if not impossible, to accurately monitor inventory when the reactor has an agitator which fits close to the walls, when the reactor has complicated internals or when the reactor has a large amount of metal within the reaction space. Additionally, when a reactor has an agitator(s) and is connected to other mechanically rotating devices, vibration makes these systems unreliable for the purposes of inventory control, especially when using weigh cells as the sensor technology.

For example, in the reactor described in U.S. Pat. No. 5,814,282, conventionally known measurement devices do not work. Component insertion is prohibited since the shaft and all of its components are in immediate proximity to the wall of the reactor.

Gear pumps, operating at a controlled speed, are typically used to supply and extract polymer from reactors such as described in U.S. Pat. No. 5,814,282. A disadvantage is that inherent minor errors in the quantitative delivery or extraction of material by such a pump will cause long term variability in the absolute reactor inventory that is unacceptable in the development of polymer properties within the reactor. This is especially important where the design of the reactor does not permit even the use of monitoring devices that provide relative measurements of the inventory.

Therefore, there is a need for a reliable method of monitoring and measuring the absolute inventory of a fluid in a vessel such as a reactor, and there is a further need for a method of controlling the absolute inventory of a fluid in a vessel such as a reactor.

SUMMARY OF THE INVENTION

The present invention provides a method for measuring and optionally controlling the absolute inventory of a dynamic fluid in a vessel, particularly a vessel having at least one agitator with a rotatable shaft extending in an essentially horizontal direction. Absolute inventory within the vessel is controlled through use and measurement of a resultant agitator force acting on the agitator in an essentially vertical direction in relation to the shaft of the agitator.

An important aspect of the present invention is the discovery that a relationship exists between the absolute inventory of a vessel and the force acting on the agitator in the essentially vertical direction which can be measured external to the vessel and used to control the vessel inventory over extended periods of continuous operation.

The method of the present invention, therefore, comprises measuring the resultant force acting on the agitator in the essentially vertical direction under a set of operating parameters and at an absolute inventory of fluid to generate a data point. This force measurement is repeated at multiple absolute inventory levels in order to generate a series of data points. The force measurements are preferably taken while holding the non-inventory related operating parameters (temperature, pressure, etc.) constant. The force measurements are taken using a force measurement instrument such as a strain gauge transducer attached in a suitable manner to the agitator shaft, preferably outside of the vessel space. The series of data points are correlated to establish a relationship between the known inventory of the fluid in the vessel and the resultant force acting on the agitator in the essentially vertical direction. The resultant force acting on the agitator in the essentially vertical direction then acts as the controlled process variable to maintain a desired absolute inventory of fluid according the relationship(s) that was established. The operating parameters of the reactor and components attached thereto, for example, the speed of a metering gear pump, are then adjusted through a series of control loop functions to maintain constant the resultant force acting on the agitator in essentially the vertical direction that corresponds to the desired absolute inventory.

In a preferred embodiment of the present invention, the fluid is a polymer. Particularly preferred polymers include polyesters, copolyesters, polyarylates, copolyarylates, polyamides, and copolyamides. The polymer may be present in the vessel in an amount ranging from about 10 to 70 percent of the available operating volume of the vessel.

In another embodiment of the present invention, the vessel is a reactor especially suitable for polycondensation reactions in which a volatile component is removed and a polymeric material of high viscosity is produced from a polymeric material of lower viscosity while remaining in a liquid state within the reactor. In another embodiment of the present invention, the reactor has two rotatable shafts. In another embodiment of the present invention, the two shafts counter rotate.

An advantage of the present invention is that the total absolute inventory of the fluid within the vessel is known at any moment in time. Acting as an input to a process control loop, for example, as in a form of feedback control, the amount of fluid in the vessel is adjusted, if necessary, to provide a constant measured force acting on the agitator in the essentially vertical direction, which in turn provides for a constant absolute inventory in the vessel. Therefore, an advantage of this method over the conventional monitoring methods is that at any moment in time the total absolute amount of the fluid in the vessel is known as opposed to the amount of the fluid at just a localized point.

Therefore, it is a principal object of the present invention to provide a reliable method for controlling the absolute inventory of a fluid in a vessel such as a reactor.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that that the drawings are not drawn to scale and that, unless otherwise indicated, they are merely intended to conceptually illustrate the structures and procedures described herein.

DESCRIPTION OF THE PREFERRED EMBODIMENTS

Figure 1:
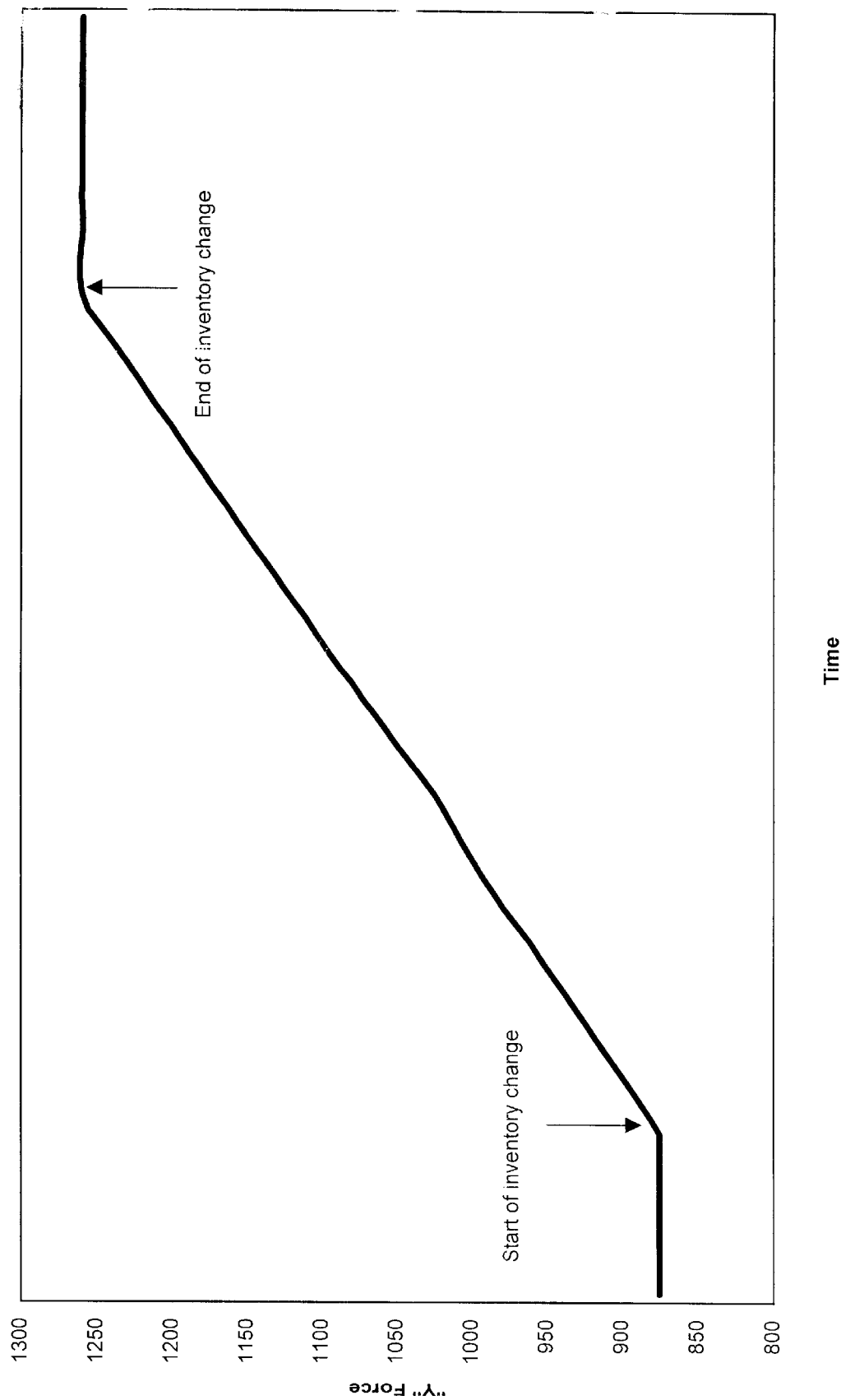
FIG. 1 is a graph depicting the trend of the forces acting in the essentially Y-radial direction with a desired absolute inventory change in the preferred reactor as a function of time when all other reactor process conditions, pressure, agitator speed, and temperature were maintained constant.

In the method of the present invention, vectored forces are generated, principally in the Y-radial direction that correlate with the fluid inventory in a vessel. The term "Y force", as used in accordance with the present invention, refers to a vector combination of the force(s) acting on an agitator within a vessel in the essentially vertical direction. The Y force upon the agitator is measured in the Y-radial direction with respect to the shaft of the agitator. The forces which make up the Y force may include, but are not limited to, the weight of the agitator, the weight of the fluid on the agitator, hydraulic reaction forces caused by rotation of the agitator in the fluid, and the buoyancy force derived from the fluid. The term "agitator", as used in accordance with the present invention, refers to a mechanical component having a shaft and at least one member extending radially from the shaft, which is capable of exerting force upon a fluid within a vessel when rotated.

The term "fluid", as used in accordance with the present invention, refers to any material having behavior characteristics of a fluid, including liquids, solids, and any combination of liquids and solids exhibiting fluid characteristics. It is preferred that the fluid in this invention has a viscosity ranging from about 20,000 centipoise to about 6,000,000 centipoise. It is further preferred that the fluid has a viscosity ranging from about 40,000 centipoise to about 4,000,000 centipoise. Preferred fluids of the present invention include, but are not limited to, polymers. Particularly preferred polymers are polyesters, copolyesters, polyarylates, copolyarylates, polyamides and copolyamides. The term "dynamic" refers to movement or activity and is used to characterize the fluid. The preferred amount of fluid inventory within the vessel ranges from about 10 to 70 percent of the available operating volume of the vessel. Preferably, the fluid occupies about 50 percent of the available operating volume of the vessel. The term "available operating volume" refers to the volume in the vessel excluding the volume occupied by internals such as the agitator shaft(s) and any components attached to this shaft, such as mixing or film forming devices.

The term "vessel", as used in accordance with the present invention, includes, but is not limited to, a structure or piece of equipment capable of holding a fluid. Examples of vessels include, but are not limited to, an extruder, a compounding machine, a mixer, and a reactor. A preferred vessel is a polymeric reactor having at least one rotatable shaft with each shaft having a set of mixing devices attached to the shaft. The optimum rotational speed of the agitator shaft(s) is based upon factors such as the polymer employed, the viscosity of the polymer as it is introduced into the reactor, the viscosity of the polymer exiting the reactor, and the temperature of the reactor. Generally, the rotational speed will be between 1 to 20 revolutions per minute (rpm), and more preferably 2 and 8 rpm. If there is more than one shaft, each shaft is preferably rotated at the same speed. Most preferred in accordance with the present invention is a reactor with two rotatable shafts that counter rotate. When the shafts counter rotate, the preferred direction is where the agitators rotate away from each other above the center line of the rotor, rather than rotating towards each other above the centerline. An advantage associated with using a vessel having two rotatable shafts that counter rotate is that it readily generates forces which are used for inventory correlation regardless of whether the vessel ranges from empty to full. The vessel of the present invention also has at least one force measurement instrument. The term "force measurement instrument", as used in accordance with the present invention, refers to an instrument capable of measuring forces acting upon the agitator in the essentially Y-radial direction. A preferred force measurement instrument is, but is not limited to, a strain gauge transducer. Additionally, a separate transducer apparatus may be used to measure applied torque. In this preferred embodiment, the strain gauge transducer is located outside of the reaction chamber.

A particularly preferred vessel employed in the method of the present invention is the reactor disclosed in U.S. Pat. No. 5,814,282, Lohe et al., incorporated herein by reference. The reactor disclosed in U.S. Pat. No. 5,814,282 has an essentially horizontal reaction chamber, having at least one inlet for introducing low viscosity polymeric materials, and at least one outlet for high viscosity polymer. Within the reactor chamber of the reactor are two rotatable parallel shafts with a plurality of stirrers and spacers fixedly mounted thereon. The stirrers on one shaft intermesh with the stirrers on the other shaft during rotation. The reactor also includes a volatile component outlet. In this reactor, the space between the stirrers and between the edge of each stirrer and the wall of the reactor is very small. The shaft forces generated in operation of this polycondensation reactor respond to polymer inventory differences, with most responsiveness in the Y-radial direction. The counter rotating shafts of the reactor gather the polymer which is resting on the bottom and adheared to the walls of the reactor and move it to the center where the two mixer profiles intermesh.

In the preferred reactor of the present invention, the agitator of the vessel consists of two counter rotating shafts, and the profiles act like paddles as they rotate into the fluid pool generating a reactive force. The term "buoyancy", the ability or tendency to float or rise in a fluid, is used to explain the reactive force of the agitator profiles as they interface with the fluid in the bottom of the reactor. In the present invention, the buoyancy can be classified as dynamic since the upward force on the restrained agitator increases with an increase in the inventory. In addition to the buoyancy, a second resultant Y force component comes from the compressive force between the profiles on the shafts. These forces do not exist when the agitator is not rotating since the fluid tends to flow around the edges of the paddles seeking its natural level.

In practice of the present invention, a data table is first constructed in order to correlate Y force values with various levels of inventory within a particular reactor. In order to generate the needed correlation data, a known inventory is placed within the reactor and maintained within the reactor under steady state conditions. The initial inventory is preferably established by using metering pumps. Although metering pumps are known to be somewhat inaccurate, the relatively limited use of the metering pumps during initial data gathering limits the effect of pump errors upon the final correlation data, as the pump errors are not allowed to accumulate over time. Additionally the absolute inventory within the reactor is measured by performing a mass balance utilizing the known total amount of input material and the known total amount of output material during the determination of the correlation between the Y forces and the absolute inventory in the reactor.

Once the vessel is loaded with an initial inventory and steady state conditions are achieved, a Y force value is measured and recorded. The initial Y force measurement and each of the subsequent Y force measurements preferably take place during operation of the vessel, when the vessel has a constant rate of input equal to a constant rate of output, resulting in an absolute inventory which is not fluctuating during any of the respective measurements.

After the initial Y force value is recorded, inventory within the vessel is increased to a second inventory level, preferably by temporarily increasing the flow rate of the input metering pump. The Y force value of the second inventory level is then monitored until it reaches a constant value, at which time it is measured and recorded. The Y force changes immediately upon addition of inventory to the vessel and, therefore, the Y force value may be measured as soon as the inventory has changed.

In a similar manner, inventory is repeatedly increased and Y force measurements are recorded incrementally over the range of anticipated inventory amounts expected to be utilized within the vessel. Similarly the absolute inventory is reduced from the highest anticipated level to another desired lower level by temporarily increasing the flow rate from the vessel to a level above the feed rate, and another determination of the Y force is made when the system within the vessel reaches steady state after each inventory change. In a similar manner, inventory is repeatedly decreased and Y force measurements are recorded incrementally over the range of anticipated inventory amounts expected to be utilized within the vessel. The absolute inventory data and Y force data are then correlated independent of the direction of change of inventory.

The correlation of absolute inventory with Y force is preferably translated into a mathematical expression for subsequent use in automatic computerized or electronic control devices. It is understood that an absolute inventory versus Y force correlation may be developed by any commonly known experimental method, and the amount of or direction of inventory change between data measurements is not critical to the invention.

Once an absolute inventory versus Y force correlation curve is developed for a particular vessel, the correlation is utilized to control absolute inventory within the vessel based on the measured value of the Y force. For example, in a given vessel, a desired inventory level within the vessel will be correlated to a known mean Y force value, the Y force value of the vessel will be continuously or periodically monitored, and in the event that the Y force were to fall outside of a predetermined range of the target Y force value, operating parameters of the vessel, equipment provided to feed or remove material from the reactor or the reactor system, are adjusted to adjust the absolute inventory within the vessel accordingly. Adjustment of the inventory by electronic control means based upon an inputted measurement is well known in the art, and such control means may be utilized to control vessel inventory based on Y force information as disclosed herein. Preferably, inventory within the vessel is adjusted by adjusting the speed of the inlet pump or the outlet pump.

It has been discovered that the Y force acting upon an agitator within a vessel containing a fluid is effected substantially by the amount of inventory within the vessel, and that this Y force effect can be used to determine the absolute amount of fluid in the vessel. Variation of other fluid characteristics, such as temperature, viscosity, flow rate, etc., may skew the relationship of the Y force to inventory somewhat, but the basic correlation of Y force to absolute inventory is maintained despite any changes in the other fluid variables. Therefore, it is preferred to generate the Y force to absolute inventory correlation curve under conditions of constant temperature, viscosity, etc., though it is possible to establish a basic correlation curve despite the fluctuations in such variables.

Similarly, the Y force measurement may simply be utilized to determine a constant or fluctuating inventory within a vessel. In a vessel or reactor system wherein the Y force is not used as a control variable, the Y force is simply used to monitor inventory within a vessel using the same correlation methods as described above.

Thus, once a proper correlation curve is developed for a particular vessel having a particular agitator, absolute inventory within the vessel may be determined without the need for any instrumentation within the vessel by measuring the essentially Y-radial direction force acting upon the agitator shaft. The Y force measurements may be used to continuously or periodically monitor the inventory within the vessel, and may further be used as a control variable for maintaining a desired vessel absolute inventory level.

The invented method of measuring, maintaining, and controlling absolute inventory within a vessel overcomes the limitations caused by inaccuracies in metering pumps and the inability to monitor vessel inventory without a measuring device being placed within the vessel.

EXAMPLE 1

FIG. 1 was generated by first plotting the Y force at a known, constant absolute inventory, then plotting the Y force while inventory was increased within the reactor, and finally plotting the Y force at a constant final absolute inventory. Reactor inventory was changed by modifying the mass flow rates of the inlet and outlet pumps at a constant agitator speed while the force acting on the agitator in the essentially Y-radial direction was recorded. In the experimental run, as shown by the solid line, total inventory within the reactor was increased from 40% to 50% of the available operating volume of the reactor, while maintaining the agitator speed at a constant 4.0 rpm. The Y force measurement increased gradually with the increased inventory.

FIG. 1 shows that the measured Y force was constant at the initial inventory amount, that the measured Y force increased with an increase in vessel inventory, and that the measured Y force once again became constant when the final inventory amount was reached. Therefore, it is shown that Y force varies with inventory within a vessel.

EXAMPLE 2

An experiment was conducted using a representative 0.63 IV (Intrinsic Viscosity) polyester (PET) polymer chip feed stock product. The solution viscosity of the polymer chip was measured in orthochlorophenol at 25° C. and an IV was calculated therefrom.

A reactor of the type described in U.S. Pat. No. 5,814,282 with two counter rotating shafts, fitted with the appropriate force transducer sensor was used to further react this low viscosity feedstock chip. The transducer is capable of measuring the Y-radial direction force upon a turning shaft. The transducer was installed as the bearing support at the non-drive end of one of the two shafts. The polymer chip feedstock used in each experiment was first dried, using a conventional vacuum drying process, and then melted in an extruder with multiple temperature control zones. An inlet metering gear pump, fed by the extruder, was connected to the reactor for pumping the molten feed stock polymer into the reactor and an outlet metering gear pump for pumping the final product polymer out of the reactor was connected to the outlet nozzle of the reactor. Just prior to reaching the inlet pump, the polymer passed through a heat exchanger for increasing the temperature of the polymer to the required feed temperature to the reactor This example demonstrates the correlation between the amount of inventory contained within a polymerization reactor and the amount of force acting in the Y-radial direction upon an agitator within the reactor. The example encompasses thirty experimental runs in which the Y force acting on the reactor agitator was measured in response to three input variables: agitator speed, reactor throughput, and total inventory within the reactor.

Agitator speed within the reactor was varied between runs, with operating speeds of 1, 2.5, or 4 revolutions per minute. It is to be understood that all process variables, within each experiment, were maintained constant after the transitions between experiments were completed in order to determine the correlation data between the absolute inventory and the Y-radial force measurement. All thirty experiments were performed in a continuous process over several days.

Reactor throughput for each run was measured by readings from an input metering gear pump which measured the polymer material entering the reactor. The reactor throughput, measured in pounds per hour, was varied between runs to values of 75.0, 112.5, and 150.0 pounds per hour.

Total absolute inventory within the reactor was measured as a percentage of available operating volume within the reactor. A beginning inventory was established within the reactor. Adjustments to the inventory were then made by increasing or decreasing the mass flow rate of melted polymer through the outlet pump with respect to the mass flow rate of melted polymer through the inlet pump. To confirm the amount of inventory within the reactor, mass balance calculations were made after each run, using the known total amount of polymer feed material used during the runs and the known total amount of product material which exited the reactor. Since the byproducts resulting from the polycondensation reaction which occurred during these experiments was generally less than 0.1% by weight of the throughput of polymer within the reactor in any cell, no correction was made to the mass balance within each experiment for this by-product weight. Inventory was varied between runs to 30%, 40%, and 50% of the available reactor volume.

A change of any one of the three variables (agitator speed, reactor throughput, and total inventory) with the remaining variables held constant, resulted in a change in Y force. Upon the change of the principal variable, absolute inventory, the Y force changed instantaneously. As the secondary variable, agitator speed and throughput, were changed between cells, a secondary effect on the Y force was determined. Determination of such secondary effects can be used to better model the interactions between these variables and improve control in the application of the invention to maintain absolute inventory in the reactor.

Table 1 below shows the summarized results from the thirty runs wherein 'Speed' indicates the rotational speed of the agitator in revolutions per minute, 'Throughput' indicates the throughput of polymer material through the reactor in pounds per hour, 'Inventory' indicates the inventory within the reactor in percentage of total available volume of the reactor, 'Y Force' is the measurement of force applied in the Y-radial direction upon the shaft of the reactor agitator, and 'Average' is the average of all of the measured Y forces for each of the shown inventory levels in the reactor.

TABLE 1

| Inventory (%) | Speed (rpm) | Throughput (Lbs/Hr) | "Y" Force |
|---|---|---|---|
| 30 | 1.0 | 75.0 | 699 |
| 30 | 4.0 | 75.0 | 633 |
| 30 | 2.5 | 112.5 | 673 |
| 30 | 1.0 | 150.0 | 663 |
| 30 | 4.0 | 150.0 | 744 |
|  |  | Average | 682 |
| 40 | 2.5 | 75.0 | 745 |
| 40 | 1.0 | 112.5 | 722 |
| 40 | 2.5 | 112.5 | 731 |
| 40 | 4.0 | 112.5 | 695 |
| 40 | 2.5 | 150.0 | 872 |
|  |  | Average | 753 |
| 50 | 1.0 | 75.0 | 902 |
| 50 | 4.0 | 75.0 | 1175 |
| 50 | 2.5 | 112.5 | 949 |
| 50 | 1.0 | 150.0 | 977 |
| 50 | 4.0 | 150.0 | 1026 |
|  |  | Average | 1006 |

The experimental runs summarized by Table 1 indicate that changes in Y force generally correspond to changes in reactor absolute inventory, despite the influences of changes in agitator speed or throughput.

The experimental results shown above describe the correlation between the absolute inventory of a reactor and the Y-radial direction force upon the shaft of the reactor holding such inventory. This correlation may be utilized in the monitoring and control of inventory within such a reactor.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A method for monitoring an absolute inventory of a fluid in a vessel having at least one agitator with a rotatable shaft extending in an essentially horizontal direction, wherein there is a resultant force acting on the agitator in the vertical direction in relation to the shaft and a relationship exists between the absolute inventory of the vessel and the force acting on the agitator in the vertical direction, the method comprising:

a) obtaining a correlation between the absolute amount of inventory within the vessel and the vertical direction resultant force acting upon the agitator of the vessel, b) measuring the resultant force acting on the agitator in the vertical direction, and c) determining the absolute inventory level within the vessel utilizing the measured resultant force value and the known correlation between the absolute amount of inventory within the vessel and the resultant force value.

2. The method as claimed in claim 1, wherein the step of obtaining a correlation between the amount of absolute inventory within the vessel and the vertical direction resultant force acting upon the agitator of the vessel comprises:

a1) measuring the resultant force acting on the agitator in the essentially vertical direction under a set of operating parameters and at a first inventory of fluid to generate a first data point, a2) measuring the resultant force acting on the agitator in the essentially vertical direction under the set of operating parameters and for at least a second inventory to generate at least a second data point, and a3) correlating the data points to establish the relationship between the absolute inventory of the fluid in the vessel and the resultant force acting on the agitator in the essentially vertical direction.

3. The method as claimed in claim 1, wherein the vessel has a continuous fluid input and a continuous fluid output.

4. The method as claimed in claim 1, wherein the fluid is a polymer.

5. The method as claimed in claim 4, wherein the polymer is selected from the group consisting of polyesters, copolyesters, polyarylates, copolyarylates, polyamides, and copolyamides.

6. The method as claimed in claim 1, wherein the vessel has an available operating volume and the fluid is in the vessel in an amount of about 10 to 70 percent of the available operating volume of the vessel.

7. The method as claimed in claim 6, wherein the amount of fluid in the vessel is about 50 percent of the available operating volume of the vessel.

8. The method as claimed in claim 1, wherein the vessel is a reactor.

9. The method as claimed in claim 8, wherein the reactor has two rotatable shafts.

10. The method as claimed in claim 9, wherein the two rotatable shafts counter rotate.

11. A method of monitoring and controlling absolute inventory of a fluid within a vessel having at least one agitator with a rotatable shaft extending in an essentially horizontal direction, wherein there is a resultant force acting on the agitator in the vertical direction in relation to the shaft and a relationship exists between the absolute inventory of the vessel and the force acting on the agitator in the vertical direction, the method comprising:

a) obtaining a correlation between the amount of inventory within the vessel and the vertical direction resultant force acting upon the agitator of the vessel, b) measuring the resultant force acting on the agitator in the vertical direction, c) determining the inventory level within the vessel utilizing the measured resultant force value and the known correlation between the amount of absolute inventory within the vessel and the resultant force value, and d) achieving a target absolute inventory level within the vessel by adjusting the set of operating parameters to attain a constant resultant force acting on the agitator in the vertical direction at the measured resultant force corresponding to the correlated target inventory level.

12. The method as claimed in claim 11, wherein the step of obtaining a correlation between the amount of absolute inventory within the vessel and the vertical direction resultant force acting upon the agitator of the vessel comprises:

a1) measuring the resultant force acting on the agitator in the essentially vertical direction under a set of operating parameters and at a first inventory of fluid to generate a first data point, a2) measuring the resultant force acting on the agitator in the essentially vertical direction under the set of operating parameters and for at least a second inventory to generate at least a second data point, and a3) correlating the data points to establish the relationship between the absolute inventory of the fluid in the vessel and the resultant force acting on the agitator in the essentially vertical direction.

13. The method as claimed in claim 11, wherein the vessel has a continuous fluid input and a continuous fluid output.

14. The method as claimed in claim 11, wherein the fluid is a polymer.

15. The method as claimed in claim 14, wherein the polymer is selected from the group consisting of polyesters, copolyesters, polyarylates, copolyarylates, polyamides, and copolyamides.

16. The method as claimed in claim 11, wherein the vessel has an available operating volume and the fluid is in the vessel in an amount of about 10 to 70 percent of the available operating volume of the vessel.

17. The method as claimed in claim 16, wherein the amount of fluid in the vessel is about 50 percent of the available operating volume of the vessel.

18. The method as claimed in claim 11, wherein the vessel is a reactor.

19. The method as claimed in claim 18, wherein the reactor has two rotatable shafts.

20. The method as claimed in claim 19, wherein the two rotatable shafts counter rotate.

21. A device for measuring the fluid inventory of a vessel, wherein the vessel has at least one agitator with a rotatable shaft extending in an essentially horizontal direction, comprising: means for measuring the force acting upon the agitator in the vertical direction, which is radial with respect to the agitator shaft; and means for expressing the measured force in the form of an absolute inventory value.

22. A device as claimed in claim 21, wherein the means for measuring force is a transducer placed about the shaft of at least one of the agitators.

23. A device as claimed in claim 22, wherein the transducer is placed about the shaft of at least one of the agitators, external to the vessel.

24. A device as claimed in claim 22, wherein the transducer is placed about the shaft of at least one of the agitators, inside the vessel.

* * * * *